(12) United States Patent
Jeong et al.

(10) Patent No.: US 9,223,990 B2
(45) Date of Patent: Dec. 29, 2015

(54) METHOD AND APPARATUS FOR APPLICATION MANAGEMENT IN USER DEVICE

(71) Applicant: Samsung Electronics Co., Ltd, Gyeonggi-do (KR)

(72) Inventors: Ilwoong Jeong, Gyeonggi-do (KR); Daeyoung Kim, Seoul (KR); Michael Chin-Hwan Pak, Seoul (KR); Jaehoon Jung, Gyeonggi-do (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 22 days.

(21) Appl. No.: 14/037,182

(22) Filed: Sep. 25, 2013

(65) Prior Publication Data

US 2014/0090077 A1    Mar. 27, 2014

(30) Foreign Application Priority Data

Sep. 25, 2012  (KR) .................. 10-2012-0106743

(51) Int. Cl.
  *G06F 21/00*  (2013.01)
  *G06F 21/60*  (2013.01)
  *G06F 21/51*  (2013.01)
(52) U.S. Cl.
  CPC ............. *G06F 21/60* (2013.01); *G06F 21/51* (2013.01)

(58) Field of Classification Search
  USPC .......................................................... 726/26
  See application file for complete search history.

(56) References Cited

U.S. PATENT DOCUMENTS

| | | | |
|---|---|---|---|
| 8,589,681 B1* | 11/2013 | Fanton et al. ................. | 713/165 |
| 8,656,465 B1* | 2/2014 | Fong-Jones ..................... | 726/5 |
| 8,726,386 B1* | 5/2014 | McCorkendale et al. ...... | 726/23 |
| 2008/0010207 A1* | 1/2008 | Yanagihara et al. ............ | 705/51 |
| 2011/0219232 A1* | 9/2011 | Yamaguchi et al. .......... | 713/169 |
| 2012/0191972 A1* | 7/2012 | Fanton et al. .................. | 713/165 |
| 2012/0291102 A1* | 11/2012 | Cohen ............................... | 726/4 |
| 2012/0291103 A1* | 11/2012 | Cohen ............................... | 726/4 |
| 2013/0074186 A1* | 3/2013 | Muttik ............................. | 726/24 |
| 2013/0097659 A1* | 4/2013 | Das et al. .......................... | 726/1 |
| 2013/0097660 A1* | 4/2013 | Das et al. .......................... | 726/1 |
| 2013/0297946 A1* | 11/2013 | Fanton et al. .................. | 713/189 |

* cited by examiner

*Primary Examiner* — Mahfuzur Rahman

(57) ABSTRACT

The method and apparatus support signature-based application management that examines credibility of an application to be installed or executed and controls installation and execution accordingly. The application management method for a user device includes: receiving user input for installing an application; comparing signature information of the application with an authentication list stored in a signature information storage; preventing, when the signature information is present in a blacklist of the authentication list, installation of the application; initiating, when the signature information is present in a whitelist of the authentication list, installation of the application; and selectively performing, when the signature information is not present in either the blacklist or the whitelist, installation of the application according to user consent.

22 Claims, 10 Drawing Sheets

METHOD AND APPARATUS FOR APPLICATION MANAGEMENT IN USER DEVICE

CROSS-REFERENCE TO RELATED APPLICATION(S) AND CLAIM OF PRIORITY

The present application is related to and claims the benefit under 35 U.S.C. §119(a) of a Korean patent application filed on Sep. 25, 2012 in the Korean Intellectual Property Office and assigned Serial No. 10-2012-0106743, the entire disclosure of which is hereby incorporated by reference.

TECHNICAL FIELD

The disclosure relates to application management in a user device and, more particularly, to a method and apparatus for application management that can enhance security of a user device by testing credibility of an application to be installed and controlling installation and execution thereof accordingly.

BACKGROUND

Recent advances in digital technologies have enabled development of various user devices that enable users in motion to communicate and process personal information. Examples of such user devices include mobile communication terminals, personal digital assistants (PDA), electronic organizers, smartphones, and tablet computers. Particularly, high-end user devices have evolved into mobile convergence devices supporting heterogeneous functions originating from distinct fields. For example, such a user device can support a variety of functions related to voice calls, video calls, SMS or MMS messages, electronic mail, navigation, image capture, broadcast reception, media (video and music) playback, Internet access, instant messaging, and social networking services (SNS).

A variety of applications are installed in a user device and an installed application is executed according to user selection. When an application is to be installed in a user device, a signature of the developer can be required. That is, the operating system (OS) of the user device can allow installation of an application only when the application has a signature of the developer. However, once an application is installed in the user device, execution thereof may be not examined. That is, an execution request for an installed application may be accepted without separate authentication.

As described above, for an application to be installed, an existing user device can check presence of a signature only but does not verify credibility of the signature. That is, a casual user may be unable to ascertain whether an application to be installed is developed and distributed by a trusted developer. Hence, a malignant application masquerading as a normal application can be easily distributed. Uncontrolled distribution of malignant applications can harm users and user devices.

SUMMARY

To address the above-discussed deficiencies of the prior art, it is a primary object to provide a method and apparatus for application management in a user device that can check credibility of an application to be installed and control installation and execution thereof accordingly.

The present disclosure also provides a method and apparatus for application management in a user device that support signature-based application management to ascertain whether an application to be installed is distributed by a trusted developer.

The present disclosure further provides a method and apparatus for application management that can enhance security of a user device by preventing installation and execution of a malignant application having originated from a suspicious source.

The present disclosure further provides a method and apparatus for application management in a user device that realize an optimal environment for facilitating a high level of security in application installation and execution to thereby enhance user convenience and device usability.

In accordance with an exemplary embodiment of the present disclosure, there is provided a method for application management in a user device, including: receiving user input for installing an application; comparing signature information of the application with an authentication list stored in a signature information storage; preventing, when the signature information is present in a blacklist of the authentication list, installation of the application; initiating, when the signature information is present in a whitelist of the authentication list, installation of the application; and selectively performing, when the signature information is not present in either the blacklist or the whitelist, installation of the application according to user consent.

In accordance with another exemplary embodiment of the present disclosure, there is provided a computer readable storage medium storing a program that causes a processor to execute the above method.

In accordance with another exemplary embodiment of the present disclosure, there is provided a user device including: a display unit displaying a screen for an authentication list of applications, a screen for confirming installation or execution of an application bearing an unidentified signature, and a screen for confirming registration of an application bearing an unidentified signature in the authentication list; a storage unit storing applications, signature information, and the authentication list; and a control unit controlling a process of comparing, in response to an installation or execution request for an application, signature information of the application with the authentication list, preventing, when the signature information is present in a blacklist, installation or execution of the application, initiating, when the signature information is present in a whitelist, installation or execution of the application, and performing, when the signature information is present in neither the blacklist nor the whitelist, installation or execution of the application according to user consent.

In accordance with another exemplary embodiment of the present disclosure, there is provided a computer readable storage medium storing a program that is configured to, in response to an installation or execution request for an application, obtain signature information of the application, compare the signature information with the blacklist and whitelist, prevent installation or execution of the application when the signature information is present in the blacklist, perform installation or execution of the application when the signature information is present in the whitelist, and prevent or perform installation or execution of the application according to user consent when the signature information is not present either in the blacklist or in the whitelist.

Hereinabove, the features and advantages of the present disclosure are described in a relatively broad perspective to help those skilled in the art understand the present disclosure. Other features and advantages constituting the subject matter of the present disclosure will be more apparent from the following detailed description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
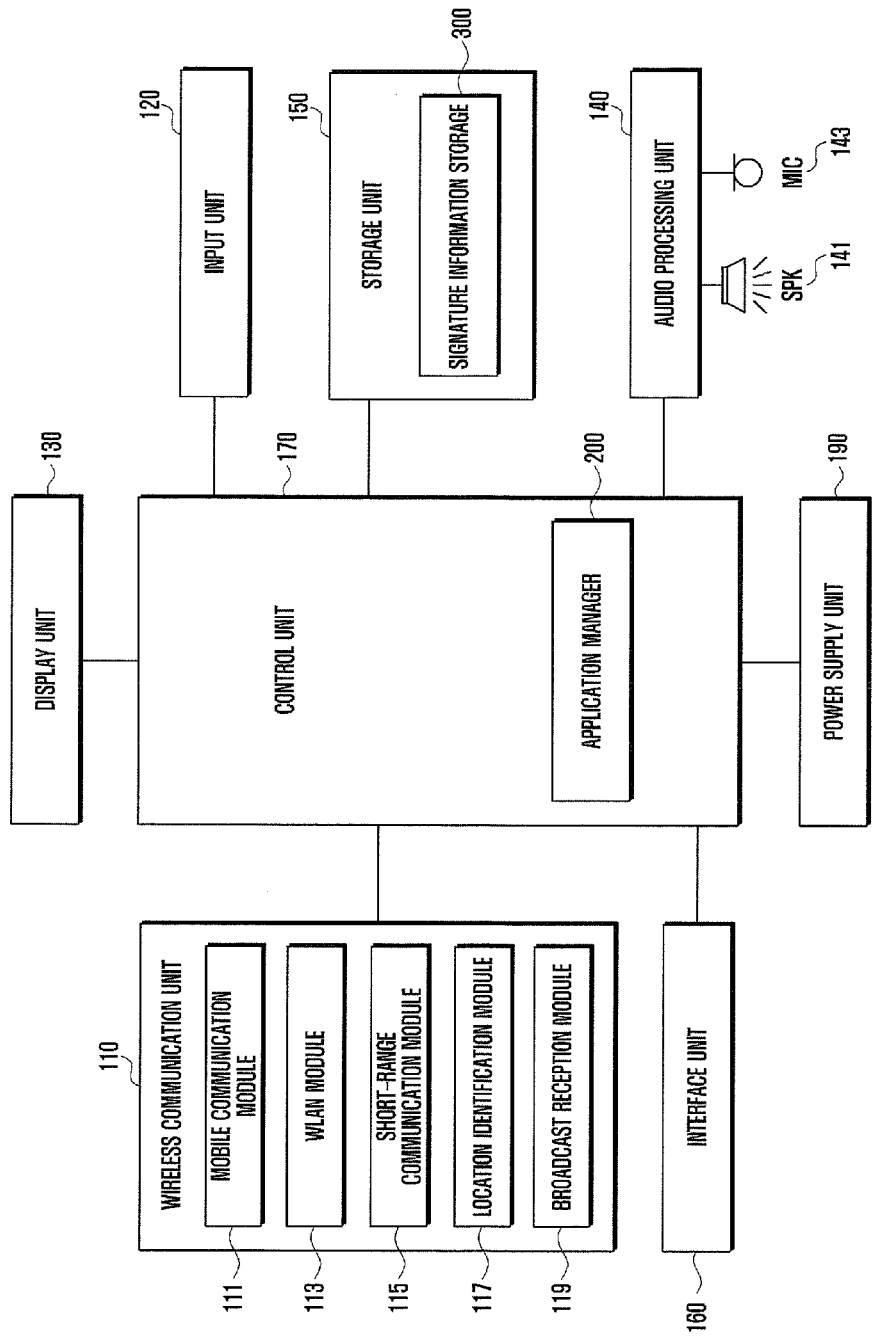
FIG. 1 illustrates block diagram of a user device according to a disclosed embodiment of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless mobile communication system. Hereinafter, exemplary embodiments of the present disclosure are described in detail with reference to the accompanying drawings. The same reference symbols are used throughout the drawings to refer to the same or like parts. Detailed descriptions of well-known functions and structures incorporated herein may be omitted to avoid obscuring the subject matter of the present disclosure. Detailed descriptions of components having substantially the same configurations and functions may also be omitted.

The present disclosure relates to a method and apparatus for application management that can enhance security and safety of a user device by examining credibility of an application to be installed and controlling installation and execution thereof accordingly.

In an embodiment, a method and apparatus for application management in a user device are provided that support signature-based application management to ascertain whether an application to be installed is distributed by a trusted developer. Signature-based application management enables more secure application installation and execution in a user device employing an operating system such as Android. In a related art technique, installation of an application is allowed only when the application has a signature without examining credibility of the signature; and once an application is installed in a user device, execution thereof is not examined or limited. However, in the disclosed embodiments, when the user attempts to install or execute an application in a user device, signature-based application installation or execution is enforced by examining whether the application has been signed by a trusted developer.

In the description, signature information can indicate information for authenticating an application. Signature information of applications provided by vendors such as a device manufacturer and network operator is registered in an authentication list. The authentication list can be separated into a whitelist maintaining signature information of applications whose credibility has been verified by a vendor (vendor-provided whitelist) and a blacklist maintaining signature information of applications whose incredibility has been verified by a vendor (vendor-provided blacklist). In addition, signature information of an application registered neither in the vendor-provided whitelist nor in the vendor-provided blacklist can be added to a user-specified whitelist or to a user-specified blacklist.

Next, a description is given of the configuration and operation of a user device with reference to the drawings. However, the configuration and operation thereof are not limited to or by the following description, and various changes and modifications are possible on the basis of the following description.

FIG. 1 illustrates block diagram of a user device according to a disclosed embodiment of the present disclosure.

Referring to FIG. 1, the user device includes a wireless communication unit 110, an input unit 120, a display unit 130, an audio processing unit 140, a storage unit 150, an interface unit 160, a control unit 170, and a power supply unit 190. As the components of the user device shown in FIG. 1 are not indispensable, a new component can be added or an existing component can be omitted or replaced. For example, when the user device does not support communication, the wireless communication unit 110 can be omitted.

The wireless communication unit 110 can include one or more communication modules to support wireless communication between the user device and a wireless communication system or between the user device and a network to which another user device is attached. For example, the wireless communication unit 110 can include a mobile communication module 111, a wireless local area network (WLAN) module 113, a short-range communication module 115, a location identification module 117, and a broadcast reception module 119.

The mobile communication module 111 sends and receives radio signals to and from at least one of a base station, an external terminal and a server through a mobile communication network. The radio signals can include various types of data related to voice calls, video calls, and text or multimedia messages. The mobile communication module 111 can connect to a content server such as Marketplace and download a selected application. In particular, the mobile communication module 111 can connect to a vendor server such as an operator server or content server, and download an application and associated signature information for authentication under control of the control unit 170.

The WLAN module 113 is used to wirelessly access the Internet or to form a WLAN link to another user device, and can be an internal or removable module. Wireless Internet access can be achieved through a technology based on Wi-Fi, WiBro (Wireless Broadband), WiMAX (Worldwide Interoperability for Microwave Access), or HSDPA (High Speed Downlink Packet Access). The WLAN module 113 can connect to a content server such as Market and download a selected application. In particular, the WLAN module 113 can connect to a vendor server, and download an application and associated signature information for authentication under control of the control unit 170. When a WLAN link to an external user device is established, the WLAN module 113 can send or receive signature information to or from the external user device according to user selection. The WLAN module 113 can send or receive signature information to or from a cloud server through a WLAN connection according to user selection.

The short-range communication module 115 performs short-range communication based on various technologies such as Bluetooth, RFID (Radio Frequency Identification), IrDA (Infrared Data Association), UWB (Ultra Wideband), ZigBee and NFC (Near Field Communication). When a short-range communication link to an external user device is established, the short-range communication module 115 can send or receive signature information to or from the external user device according to user selection.

The location identification module 117 is a module for identifying the current location of the user device. A GPS (Global Positioning System) receiver is a representative example. The location identification module 117 can obtain 3D location information composed of longitude, latitude and altitude by applying trigonometry to distance and time data received from three or more base stations. The location identification module 117 can obtain current location information using distance and time data received from three or more GPS satellites. Location information of the user device can be obtained through various schemes.

The broadcast reception module 119 can receive TV, radio and data broadcast signals and/or broadcast information regarding channels, programs and providers from an external broadcast management server through broadcast channels including satellite channels and terrestrial channels.

The input unit 120 generates an input signal for manipulating the user device. The input unit 120 can include a keypad, dome switch, (resistive/capacitive) touchpad, jog wheel and jog switch. The input unit 120 can be realized using buttons on the exterior of the user device and buttons on a touch panel.

The display unit 130 displays information processed by the user device and information to be processed. For example, during a call, the display unit 130 displays a call handling UI (user interface) or GUI (graphical UI) screen. During a video call or an image capture mode, the display unit 130 displays a received image, captured image, or UI or GUI screen. In particular, the display unit 130 can display various UI or GUI screens for application installation. For example, the display unit 130 can display a screen for downloading an application in response to a user request, a screen for confirming installation of an application bearing an unidentified signature, and a screen for confirming registration of an application bearing an unidentified signature in an authentication list. During execution of an application, the display unit 130 can display an application screen. The display unit 130 can display an authentication list according to a user request. Here, the authentication list can be separately displayed as a vendor-provided whitelist, vendor-provided blacklist, user-specified whitelist and user-specified blacklist, or as a unified list. Representative screens output by the display unit 130 are described later.

The display unit 130 can be realized using a technology based on at least one of liquid crystal display (LCD), thin film transistor liquid crystal display (TFT LCD), light emitting diodes (LED), organic LEDs (OLED), active matrix OLEDs (AMOLED), flexible display, bendable display, and 3-dimensional display. The display unit 130 can also use a transparent display technology so as to be seen from the outside.

The display unit 130 can be combined with a touch panel sensing touch gestures in a layered structure to form a touchscreen, which acts as an input and output means. The touch panel can generate an electrical input signal corresponding to a capacitance or pressure change caused by touching a portion of the display unit 130. The touch panel can detect the location, area, and pressure of a touch. A signal corresponding to a touch on the touch panel is sent to a touch controller (not shown). The touch controller processes the touch signal and sends corresponding touch data to the control unit 170. Thereby, the control unit 170 can identify the touched region of the display unit 130.

The audio processing unit 140 sends an audio signal from the control unit 170 to a speaker 141, and sends an audio signal such as a voice signal from a microphone 143 to the control unit 170. Under control of the control unit 170, the audio processing unit 140 can audibly output voice or sound data through the speaker 141, and convert an audio signal like a voice signal collected by the microphone 143 into a digital signal and send the digital signal to the control unit 170.

The speaker 141 is used to output audio data received through the wireless communication unit 110 or stored in the storage unit 150 during a call, recording, speech recognition, broadcast reception or image capture. The speaker 141 is used to output sounds related to a function being executed, such as application execution, application installation, call reception, call placement, image capture, or music playback.

The microphone 143 collects an acoustic signal from the outside during a call, recording, speech recognition or image capture and converts the acoustic signal into sound data. During a call, sound data can be transmitted through the mobile communication module 111 to a base station. In the microphone 143, various noise reduction algorithms can be used to remove or reduce noise from an acoustic signal collected from the outside.

The storage unit 150 can store programs for operation of the control unit 170 and temporarily store input/output data, such as an application, signature information, authentication list (whitelist and blacklist), image file, phone number, message, audio file, moving image, and electronic book. The storage unit 150 can store information regarding usage frequencies, importance levels and priorities of individual data items used during operation of the user device, such as signature information, image files, applications, phone numbers, messages and multimedia files. The storage unit 150 can store vibration data and sound data to be output in various patterns in response to touches on the touchscreen. In particular, the storage unit 150 includes a signature information storage 300 to store signature information of applications. The signature information storage 300 is used to store an authentication list such as a whitelist and blacklist obtained from a vendor such as a network operator or manufacturer. In the storage unit 150, the signature information storage 300 is used to separately maintain a vendor-provided whitelist, vendor-provided blacklist, user-specified whitelist, and user-specified blacklist. A configuration of the storage unit 150 (the signature information storage 300 in particular) is described later.

The storage unit 150 can include one or more of various types of storage media, such as flash memory, hard disk, multimedia or other memory card (micro, SD or XD), random access memory (RAM), static random access memory (SRAM), read only memory (ROM), programmable read-only memory (PROM), electrically erasable programmable read-only memory (EEPROM), magnetic RAM (MRAM), magnetic disk, and optical disc. The user device can function in cooperation with a web storage serving as a storage unit on the Internet.

The interface unit 160 provides data or power paths leading to external devices connected with the user device. The interface unit 160 is used to send and receive data to and from external devices, and to receive power from an external power source. For example, the interface unit 160 can include a plurality of ports for a wired or wireless headset, battery charger, wired or wireless data storage, memory card, device with an identification module, audio input/output, video input/output, and earphone.

The control unit 170 controls overall operation of the user device. For example, the control unit 170 can perform control and processing operations for voice, video and data calls. The control unit 170 can include a multimedia module (not shown) for multimedia playback. Such a multimedia module can be realized as an internal component of the control unit 170 or as a separate entity. In particular, the control unit 170 controls overall operation for signature-based application installation and execution of the disclosed embodiments. The control unit 170 includes an application manager 200 to control application installation and execution with reference to the authentication list stored in the storage unit 150. A configuration of the application manager 200 is described later.

In one embodiment, in response to an installation or execution request for an application, the control unit 170 compares signature information of the application with the authentication list. When the signature information is present in the blacklist, the control unit 170 controls an operation not to install or execute the application; when the signature information is present in the whitelist, the control unit 170 controls an operation to install or execute the application; and when the signature information is not present in either the whitelist or blacklist (i.e. the application bears an unidentified signature), the control unit 170 controls installation or execution of the application according to user consent.

In one embodiment, when an application whose signature information is registered in the whitelist is executed, the control unit 170 records an execution history of the application. When an execution request for an application is issued, the control unit 170 examines the execution history of the application and controls execution of the application according to necessity for authentication. That is, the control unit 170 performs authentication using the signature information of the application when authentication of the application is necessary, and executes the application when authentication of the application is unnecessary. Here, applications needing authentication include an application whose execution is requested for the first time and an application not bearing a signature or bearing an unidentified signature; and applications not needing authentication include an application that is registered in the whitelist and has been successfully executed before.

Operations of the control unit 170 are described in detail later with reference to the drawings for user device operation and control.

The power supply unit 190 supplies power from an internal or external power source to the components of the user device under control of the control unit 170.

Various embodiments of the present disclosure can be implemented in hardware or as software or computer code that can be stored in a storage medium readable by a computer or a similar device. Hardware implementation can be achieved using at least one of an application specific integrated circuit (ASIC), digital signal processor (DSP), digital signal processing device (DSPD), programmable logic device (PLD), field programmable gate array (FPGA), processor, controller, micro-controller, microprocessor, and electric unit realizing a specific function. Some embodiments can be directly implemented by the control unit 170. Embodiments of procedures and functions described herein can be implemented as separate software modules. Each software module can perform one or more functions or operations described herein.

The storage medium readable by a computer can store a program that is configured to, in response to an installation or execution request for an application, obtain signature information of the application, compare the signature information with the blacklist and whitelist, prevent installation or execution of the application when the signature information is present in the blacklist, perform installation or execution of the application when the signature information is present in the whitelist, and prevent or perform installation or execution of the application according to user consent when the signature information is not present either in the blacklist or in the whitelist.

The user device shown in FIG. 1 can be any information and communication appliance or multimedia appliance using an application processor (AP), graphical processing unit (GPU), or central processing unit (CPU). For example, the user device can be a mobile communication terminal based on communication protocols supporting various communication systems, a tablet computer, a smartphone, a digital camera, a portable multimedia player (PMP), a media player, a portable game console, or a personal digital assistant (PDA). In addition, the method of the disclosed embodiments can be applied to various display devices such as a digital TV, a digital signage (DS) and a large format display (LFD).

Figure 2:
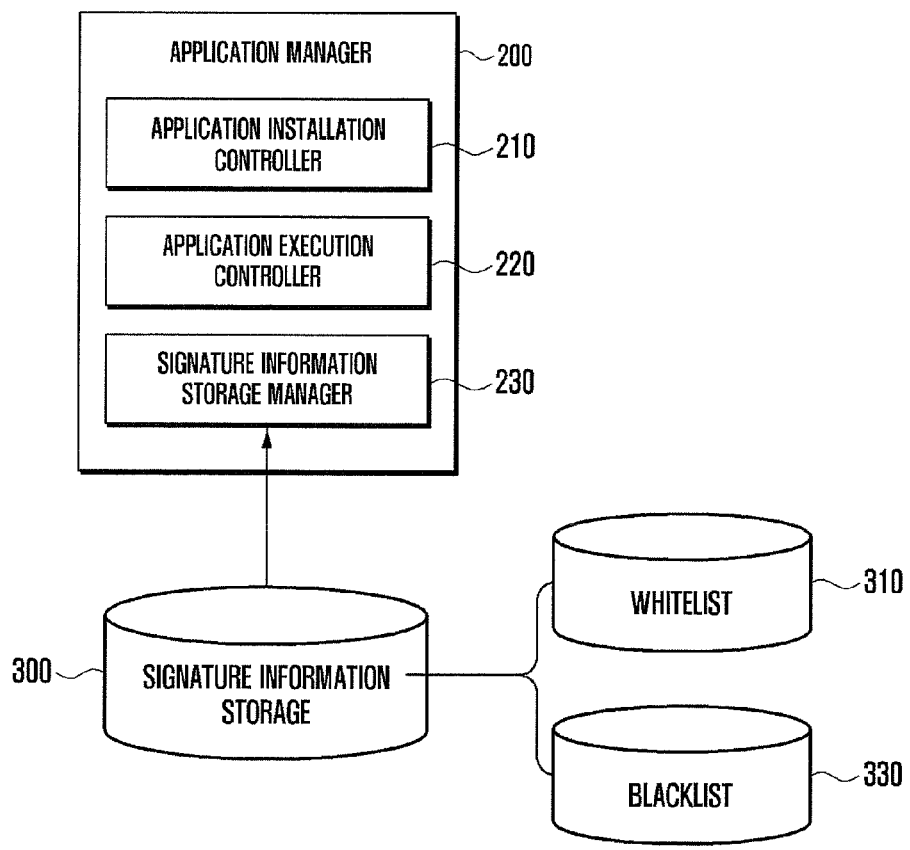
FIG. 2 illustrates a configuration of an application manager in the user device of FIG. 1.

FIG. 2 illustrates a configuration of the application manager 200 in the user device of FIG. 1.

FIG. 2 depicts a situation in which the application manager 200 refers to a whitelist 310 and a blacklist 330 registered in the signature information storage 300 to perform application management.

Referring to FIG. 2, the application manager 200 includes an application installation controller 210, an application execution controller 220, and a signature information storage manager 230.

The application installation controller 210 examines, according to an installation request for an application, a signature of the application, and can permit immediate installation of the application, request user confirmation or reject installation of the application.

In response to an installation request for an application, the application installation controller 210 refers to the authentication list stored in the signature information storage 300 and permits immediate installation of the application when the signature information of the application is registered in the whitelist 310.

When the signature information of the application is registered in the blacklist 330, the application installation controller 210 can regard the application as malware and prevent installation of the application. Here, when the application is regarded as malware, the application installation controller 210 can output a notification indicating prevention of application installation due to malware.

When the signature information of the application is not registered either in the whitelist 310 or in the blacklist 330, the application installation controller 210 may or may not install the application according to user confirmation. Here, when the user decides to install the application, the application installation controller 210 can register the signature information of the application in the whitelist 310 (particularly, in a user-specified whitelist to be described later). When the user decides not to install the application, the application installation controller 210 may register the signature information of the application in the blacklist 330 (particularly, in a user-specified blacklist to be described later).

The application execution controller 220 examines, according to an execution request for an application, the signature of the application, and can permit immediate execution of the application, request user confirmation or reject execution of the application.

In response to an execution request for an application, the application execution controller 220 refers to the authentication list stored in the signature information storage 300 and permits immediate execution of the application when the signature information of the application is registered in the whitelist 310.

When the signature information of the application is registered in the blacklist 330, the application execution controller 220 can regard the application as malware and prevent execution of the application. Here, when the application is regarded as malware, the application execution controller 220 can output a notification indicating prevention of application execution due to malware. In addition, the application execution controller 220 can uninstall the application regarded as malware from the user device according to user selection.

When the signature information of the application is not registered either in the whitelist 310 or in the blacklist 330, the application execution controller 220 may or may not execute the application according to user confirmation. Here, when the user decides to execute the application, the application execution controller 220 can register the signature information of the application in the whitelist 310 (particularly, in a user-specified whitelist to be described later). When the user decides not to execute the application, the application execution controller 220 can register the signature information of the application in the blacklist 330 (particularly, in a user-specified blacklist to be described later).

The signature information storage manager 230 controls editing (addition, deletion and modification) of application signature information supplied by vendors such as a manufacturer and operator or specified by the user.

Figure 3:
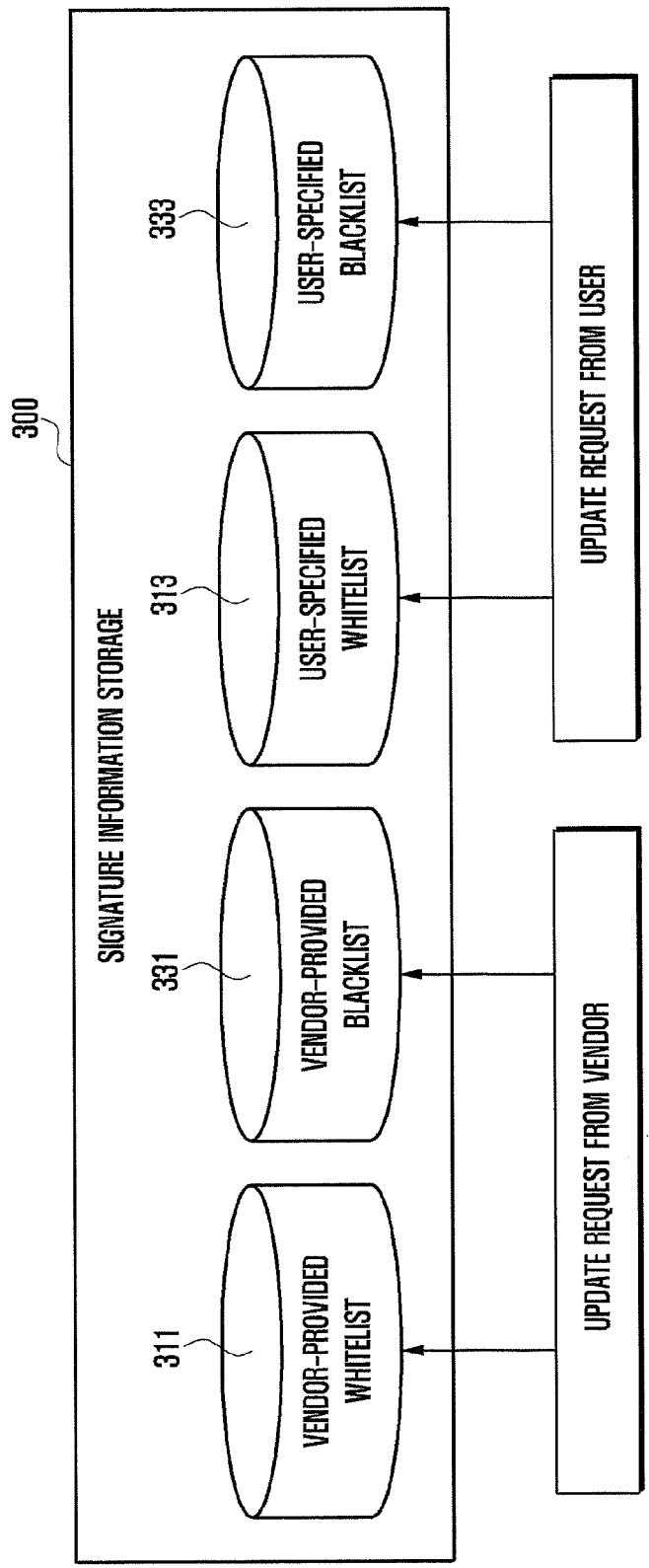
FIG. 3 illustrates a configuration of a signature information storage in the user device of FIG. 1.

FIG. 3 illustrates a configuration of the signature information storage 300 in the user device of FIG. 1.

Referring to FIG. 3, as described above, the signature information storage 300 can separately store the whitelist 310 and blacklist 330. Particularly, in the signature information storage 300, the whitelist 310 and the blacklist 330 can each separately store signature information supplied by vendors such as a manufacturer and operator and signature information added by the user.

For example, the signature information storage 300 can separately store a vendor-provided whitelist 311, a vendor-provided blacklist 331, a user-specified whitelist 313 and a user-specified blacklist 333. The vendor-provided whitelist 311 and vendor-provided blacklist 331 can be updated by a vendor such as a manufacturer or operator, and the user-specified whitelist 313 and user-specified blacklist 333 can be updated by the user.

That is, signature information of an application authenticated by the vendor can be recorded in the vendor-provided whitelist 311, and signature information of an application determined as malware by the vendor can be recorded in the vendor-provided blacklist 331. Signature information of an application confirmed by the user can be recorded in the user-specified whitelist 313, and signature information of an application determined as malware by the user can be recorded in the user-specified blacklist 333.

As described above, the application manager 200 supporting signature-based application management of the disclosed embodiments can have the following features.

The application installation controller 210, serving as part of a signature-based operating system framework, can control application installation with reference to signature information present in the whitelist 310 and blacklist 330 stored in the signature information storage 300. The application execution controller 220, serving as part of the signature-based operating system framework, can control application execution with reference to signature information present in the whitelist 310 and blacklist 330 stored in the signature information storage 300.

The signature information storage 300 can be used to separately store and manage signature information of applications in the whitelist 310 and blacklist 330, particularly, in the vendor-provided whitelist 311, vendor-provided blacklist 331, user-specified whitelist 313 and user-specified blacklist 333. In an embodiment, there is a provided a feature that can update signature information supplied by vendors such as a manufacturer and operator and update signature information specified by the user.

Figure 4:
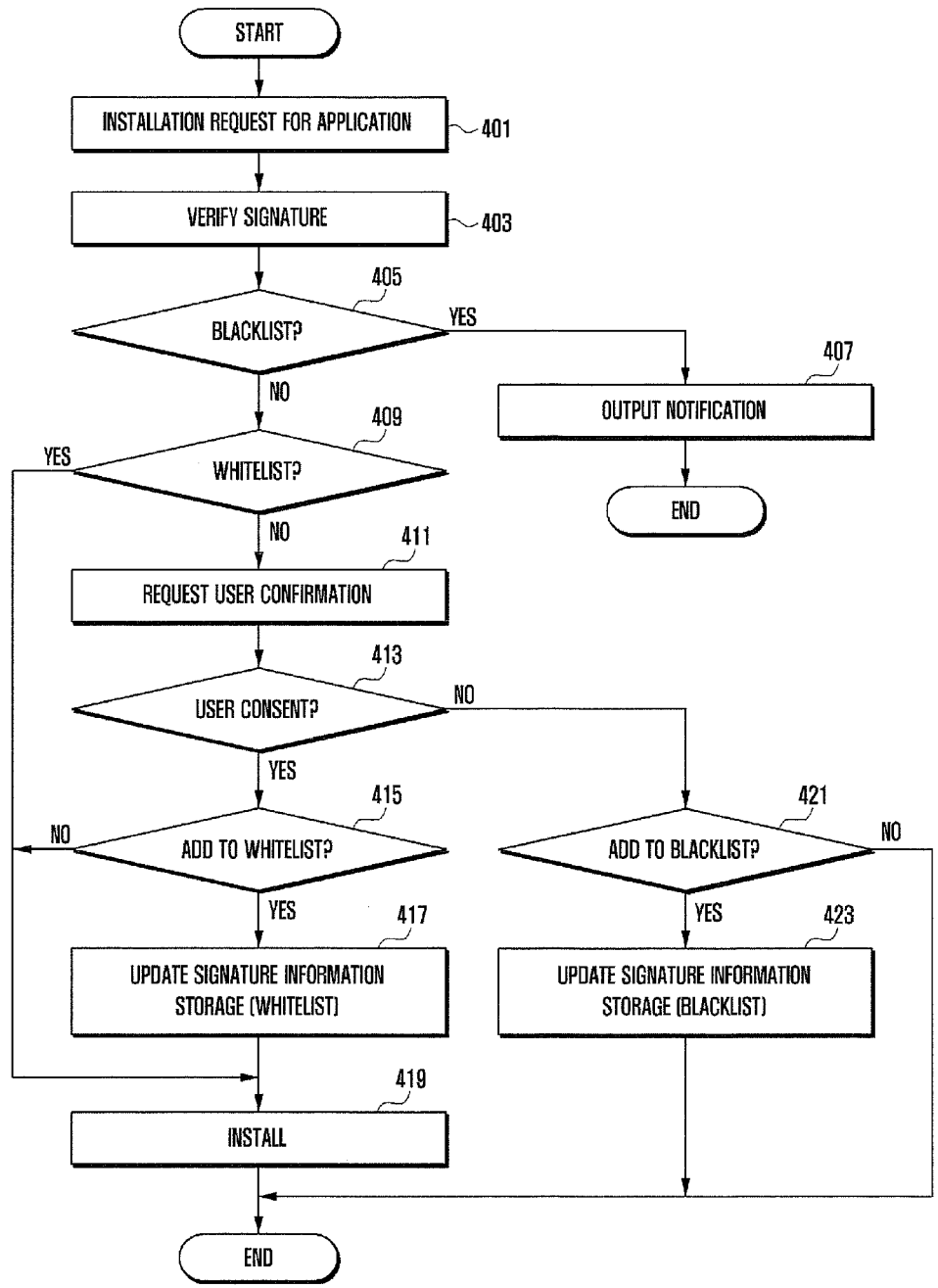
FIG. 4 illustrates a process for application installation in the user device according to a disclosed embodiment of the present disclosure.

FIG. 4 illustrates a process for application installation in the user device according to a disclosed embodiment.

Referring to FIG. 4, the control unit 170 of the user device receives an installation request for an application (401). The control unit 170 verifies signature information of the requested application by comparing the signature information with the authentication list (403). For example, the user can connect to a content server, find an application to be installed, download the found application, and issue an installation request for the downloaded application through a touch gesture. Then, the control unit 170 can obtain signature information of the application from the content server and compare the obtained signature information with signature information stored in the signature information storage 300. Here, the control unit 170 can verify the signature information of the application with reference to the blacklist 330 and whitelist 310 stored in the signature information storage 300.

The control unit 170 checks whether the signature information of the application is present in the blacklist 330 (405). To this end, the control unit 170 can compare the signature information of the application with the blacklist 330 stored in the signature information storage 300.

When the signature information of the application is present in the blacklist 330, the control unit 170 can output a notification (407). That is, the control unit 170 can prevent installation of the requested application and output a notification indicating prevention of application installation due to malware. Here, the control unit 170 can prevent application installation only and skip output of such notification according to user settings.

When the signature information of the application is not present in the blacklist 330, the control unit 170 checks whether the signature information of the application is present in the whitelist 310 (409). To this end, the control unit 170 can compare the signature information of the application with the whitelist 310 stored in the signature information storage 300.

When the signature information of the application is present in the whitelist 310, the control unit 170 installs the application (419). For example, the control unit 170 can control an operation to install an application downloaded from a content server in the user device.

When the signature information of the application is not present in the whitelist 310, the control unit 170 requests the user to confirm installation of the application (411), and checks whether the user has confirmed installation of the application (413). For example, the control unit 170 can output a notification indicating unidentified signature information and request the user to decide whether to continue application installation.

When the user has confirmed installation of the application (i.e. upon reception of user consent to application installation), the control unit 170 requests the user to decide whether to add the signature information of the application to the whitelist 310 (415). For example, upon reception of user input for consenting to application installation, the control unit 170 can output a popup requesting the user to decide whether to add the signature information of the application to the whitelist 310 in the signature information storage 300. Here, step 415 for checking user intention to add the signature information to the whitelist 310 can be skipped according to user settings. Hence, such popup can be output or not output before a step for application installation depending upon user settings.

When the user has decided not to add the signature information, the control unit 170 installs the application (419). For example, the control unit 170 can control an operation to install an application downloaded from a content server in the user device.

When the user has decided to add the signature information, the control unit 170 updates the signature information storage 300 (417). Here, the control unit 170 can add the signature information of the application to the user-specified whitelist 313 of the whitelist 310. Thereafter, the control unit 170 installs the application (419).

When the user has not confirmed installation of the application at step 413 (i.e. upon reception of user refusal for application installation), the control unit 170 requests the user to decide whether to add the signature information of the application in the blacklist 330 (421). For example, upon reception of user input for cancelling application installation, the control unit 170 can output a popup requesting the user to decide whether to add the signature information of the application to the blacklist 330 in the signature information storage 300. Here, step 421 for checking user intention to add the signature information to the blacklist 330 can be skipped according to user settings. Hence, such popup can be output or not output before a step for installation termination depending upon user settings.

When the user has decided not to add the signature information, the control unit 170 ends the installation procedure. For example, the control unit 170 can terminate application installation and restore a previous screen (e.g. application selection screen).

When the user has decided to add the signature information, the control unit 170 updates the signature information storage 300 (423). Here, the control unit 170 can add the signature information of the application to the user-specified blacklist 333 of the blacklist 330. After registration of the signature information, the control unit 170 ends the installation procedure.

The above control operation of the control unit 170 can be supported by the application manager 200 (the application installation controller 210 in particular). That is, the application installation controller 210 can compare signature information of a requested application to the blacklist 330 (the vendor-provided blacklist 331 in particular) and the whitelist 310 (the vendor-provided whitelist 311 in particular). When the signature information of the application is registered in the blacklist 330, the application installation controller 210 can prevent installation of the application. When the signature information of the application is registered in the whitelist 310, the application installation controller 210 can start to install the application. For the application that is not registered either in the blacklist 330 or in the whitelist 310, the application installation controller 210 may initiate or prevent installation of the application according to user consent. Additionally, the application installation controller 210 can add the signature information of the application to the user-specified blacklist 333 or to the user-specified whitelist 313 in accordance with user consent.

FIGS. 5 to 8 are screen representations illustrating application installation in the user device.

FIGS. 5 to 8 illustrate installation initiation or installation prevention for an application whose signature information is not registered in either the whitelist 310 or the blacklist 330 (e.g. an application without a signature) according to user consent.

Figure 5:
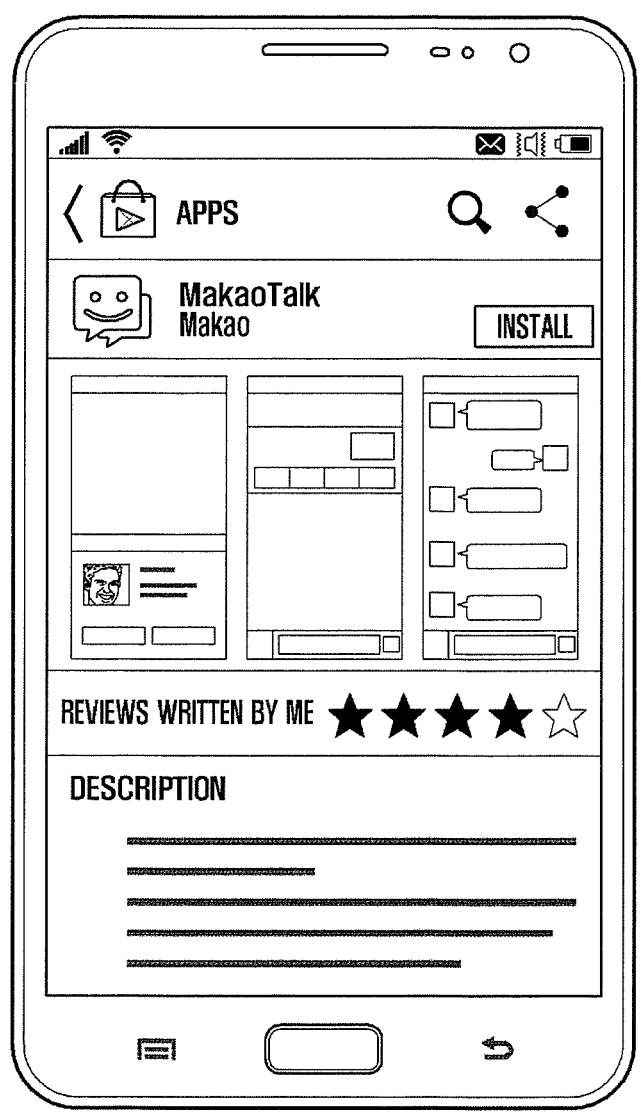
FIGS. 5, 6, 7 and 8 are screen representations illustrating application installation in the user device.

FIG. 5 illustrates a screen waiting for user selection to initiate installation of a downloaded application. For example, in response to a user command for accessing a content server (for example, Marketplace), the user device can connect to the content server through the wireless communication unit 110 (particularly, the mobile communication module 111 or the WLAN module 113). In response to input user commands, the user device can select an application from the content server, download the selected application, and display an installation screen.

In a state in which the installation screen is displayed as shown in FIG. 5, to initiate installation of the application (for example, MakaoTalk), the user can generate a selection event on an install icon 500. For example, the user can select or touch the install icon 500 on the installation screen. Upon reception of the selection event from the install icon 500, the user device can obtain signature information of the application and compare the signature information with the blacklist 330 and the whitelist 310 stored in the signature information storage 300. When the signature information of the application is present in the whitelist 310, the user device can continue to install the application. When the signature information of the application is present in the blacklist 330, the user device can quit installation of the application.

Figure 6:
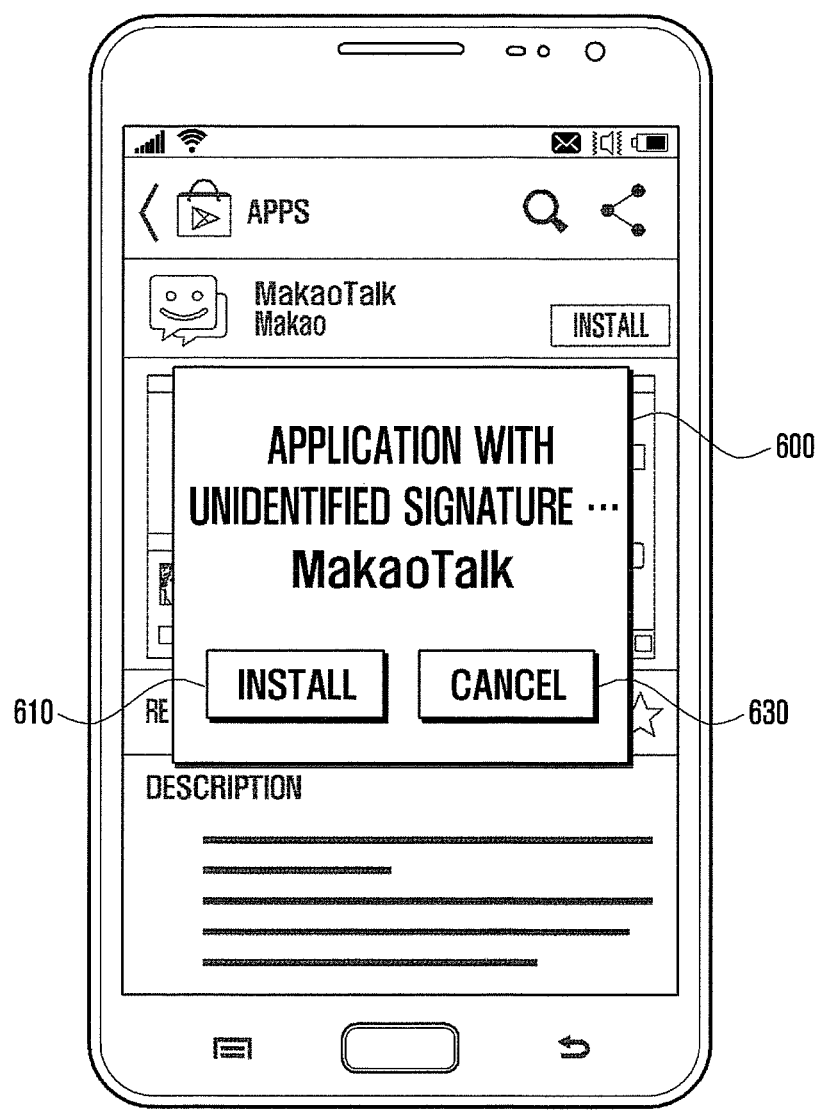

When the signature information of the application is registered in neither the blacklist 330 nor in the whitelist 310, the user device can output a popup 600 requesting the user to decide whether to initiate or cancel installation of the application bearing an unidentified signature as shown in FIG. 6. That is, FIG. 6 illustrates a popup 600 enabling the user to select one of initiation and cancellation of installation of an application bearing an unidentified signature.

In one embodiment, the user can decide whether to initiate or cancel installation of an application bearing an unidentified signature through the popup 600. For example, the user can select or touch an install button 610 of the popup 600 to initiate installation of the application bearing an unidentified signature. The user can select or touch a cancel button 630 of the popup 600 to cancel installation of the application bearing an unidentified signature.

Specifically, the user can generate a selection or touch event to select one of two options for the application bearing an unidentified signature when the popup 600 is output as shown in FIG. 6. For example, the user can generate a selection event to select the install button 610 of the popup 600, or generate a selection event to select the cancel button 630 of the popup 600. Upon reception of a user input for determining installation initiation or installation cancelation for the application, the user device can output a screen as shown in FIG. 7 or FIG. 8.

Figure 7:
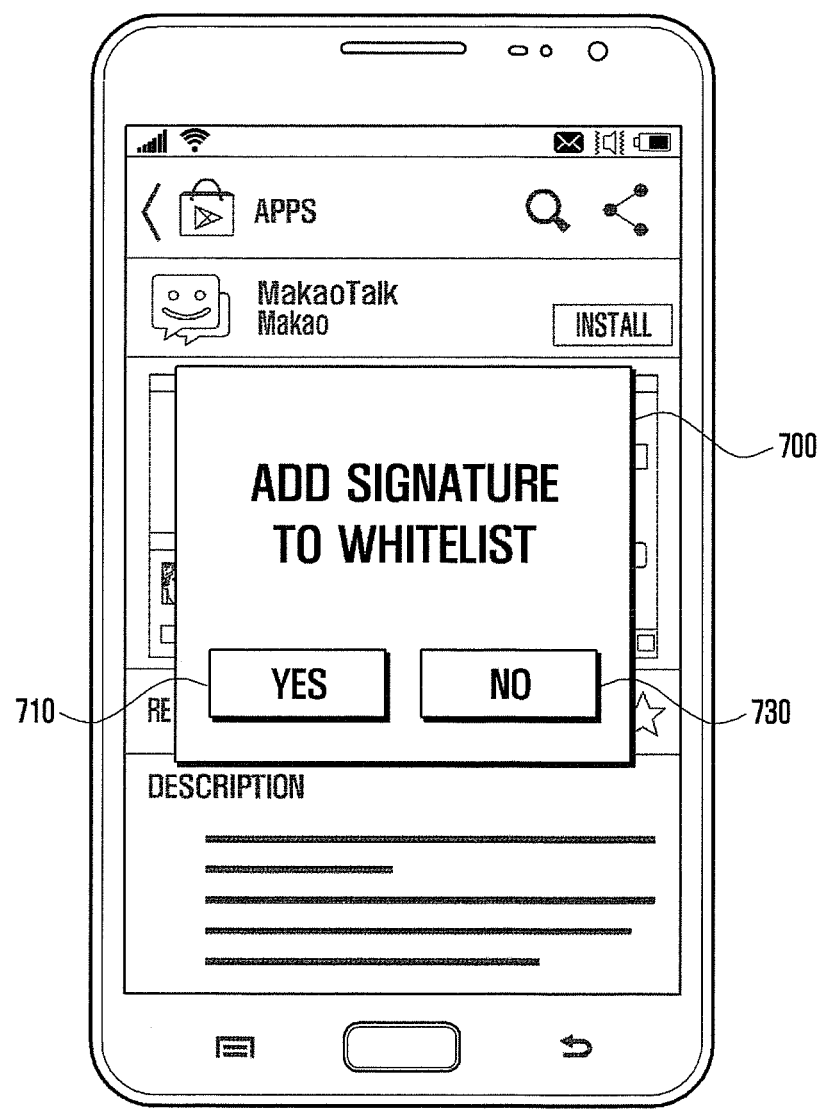
Figure 8:
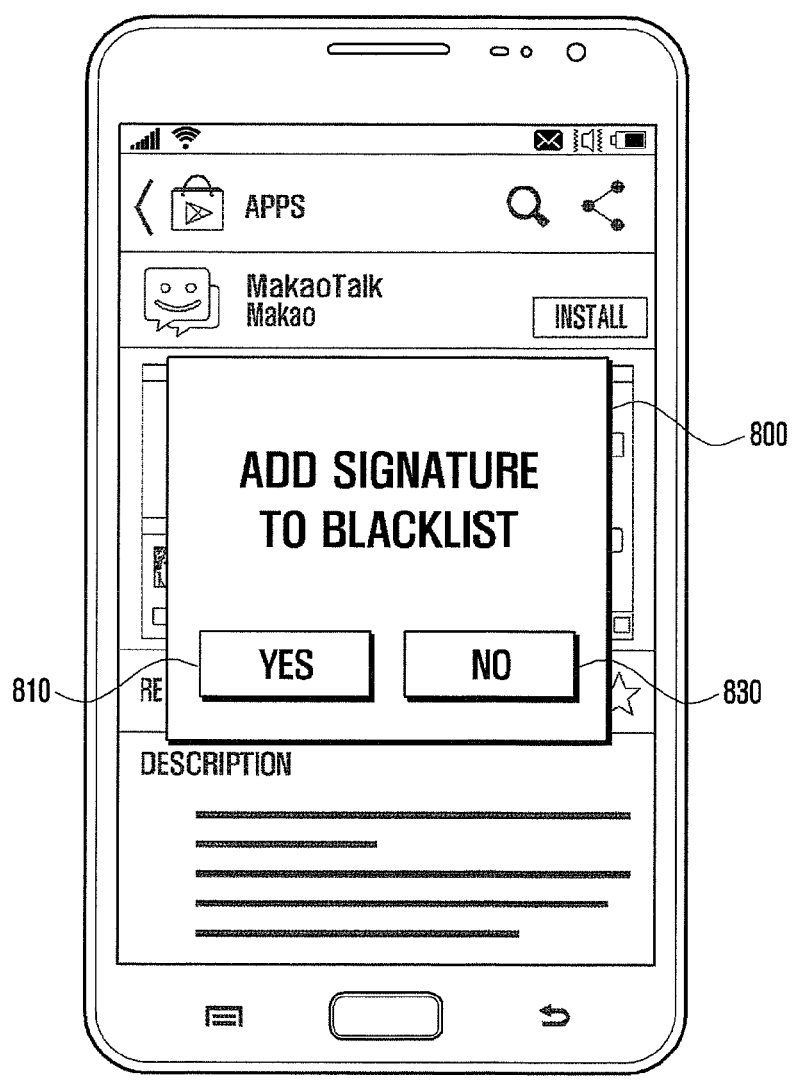

That is, when the user selects to install the application with an unidentified signature through the popup 600, the user device can display a popup 700 requesting the user to decide whether to add signature information of the application to the whitelist 310 as shown in FIG. 7. That is, the screen of the user device transitions from a screen shown in FIG. 6 to a screen shown in FIG. 7 in response to user selection for continuation of application installation.

In a state in which the popup 700 requesting the user to decide whether to add signature information of the application to the whitelist 310 is displayed as shown in FIG. 7, the user can select whether to add signature information of the application to the whitelist 310. For example, the user can select or touch a "Yes" button 710 of the popup 700 to add signature information of the application bearing an unidentified signature to the whitelist 310. The user can select or touch a "No" button 730 of the popup 700 not to add signature information of the application bearing an unidentified signature to the whitelist 310.

Upon selection of the "Yes" button 710, the user device can add the signature information of the application bearing an unidentified signature to the whitelist 310 (the user-specified whitelist 313 in particular) and initiate installation of the application. Upon selection of the "No" button 730, the user device can directly initiate installation of the application.

When the user selects not to install the application with an unidentified signature through the popup 600, the user device can display a popup 800 requesting the user to decide whether to add signature information of the application to the blacklist 330 as shown in FIG. 8. That is, the screen of the user device transitions from a screen shown in FIG. 6 to a screen shown in FIG. 8 in response to user selection for cancellation of application installation.

In a state in which the popup 800 requesting the user to decide whether to add signature information of the application to the blacklist 330 is displayed as shown in FIG. 8, the user can select whether to add signature information of the application to the blacklist 330. For example, the user can select or touch a "Yes" button 810 of the popup 800 to add signature information of the application bearing an unidentified signature to the blacklist 330. The user can select or touch a "No" button 830 of the popup 800 not to add signature information of the application bearing an unidentified signature to the blacklist 330.

Upon selection of the "Yes" button 810, the user device can add the signature information of the application bearing an unidentified signature to the blacklist 330 (the user-specified blacklist 333 in particular) and terminate application installation. Upon selection of the "No" button 830, the user device can immediately terminate application installation.

As described above, in a disclosed embodiment, installation of an application bearing an unidentified signature can require user consent and signature information of such application can be added to the user-specified whitelist 313 or user-specified blacklist 333.

Figure 9:
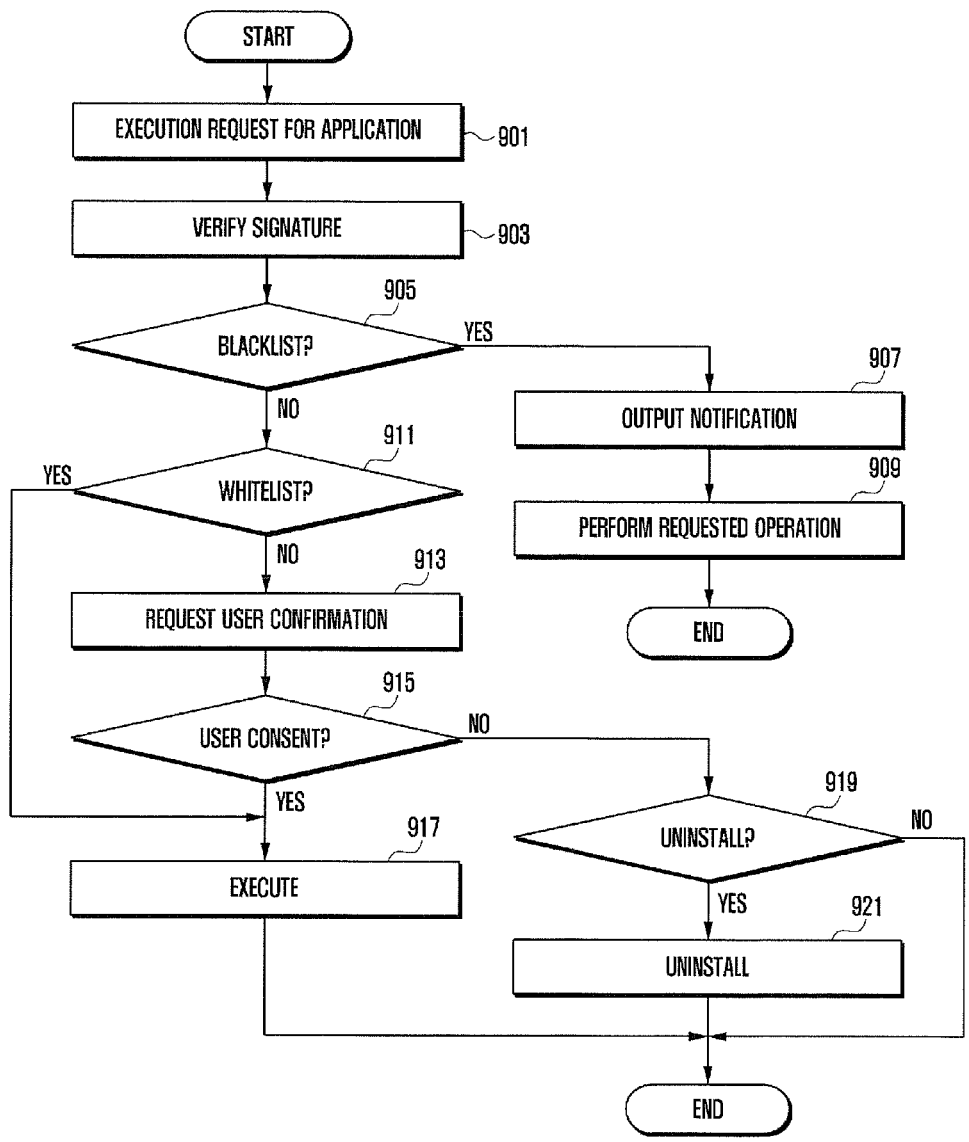
FIG. 9 illustrates a process for application execution in the user device according to a disclosed embodiment of the present disclosure.

FIG. 9 illustrates a process for application execution in the user device according to a disclosed embodiment of the present disclosure.

Referring to FIG. 9, the control unit 170 of the user device receives an execution request for an application (901). The control unit 170 verifies signature information of the requested application by comparing the signature information with the authentication list (903). For example, the user can locate an application to be executed on a home screen or menu screen and issue an execution request by selecting or touching the located application. Then, the control unit 170 can obtain signature information of the requested application and compare the obtained signature information with signature information stored in the signature information storage 300. Here, the control unit 170 can verify the signature information of the application with reference to the blacklist 330 and whitelist 310 stored in the signature information storage 300.

In one embodiment, an application can be configured to have a file area in which signature information thereof is stored during installation. The file area of an application can be used to record information on the application and a part of the file area can be used to record signature information of the application. Alternatively, a storage space can be provided in the storage unit 150 of the user device to record signature information of individual applications. Here, to associate applications with signature information thereof, a mapping table can be used to record mappings between identification information of applications and addresses of storage locations in which signature information is stored.

The control unit 170 checks whether the signature information of the application is present in the blacklist 330 (905). To this end, the control unit 170 can compare the signature information of the application with the blacklist 330 stored in the signature information storage 300.

When the signature information of the application is present in the blacklist 330, the control unit 170 can output a notification (907). That is, the control unit 170 can prevent execution of the requested application and output a notification indicating prevention of application execution due to malware. Here, the control unit 170 can prevent application execution only and skip output of such notification according to user settings. Alternatively, the control unit 170 can output such notification, and can provide an option for forced application execution and initiate execution of the application according to user selection.

After notification output, the control unit 170 can perform a requested operation (909). For example, the control unit 170 can uninstall the requested application from the user device according to user settings. The control unit 170 can uninstall the application after obtaining user consent or automatically uninstall the application without user consent. In particular, when an execution request is issued for a malignant application that has been installed owing to erroneous user consent, the control unit 170 can request the user to decide whether to execute the application and uninstall the application when the user decides not to execute the application (execution cancelled).

When the signature information of the application is not present in the blacklist 330, the control unit 170 checks whether the signature information of the application is present in the whitelist 310 (911). To this end, the control unit 170 can compare the signature information of the application with the whitelist 310 stored in the signature information storage 300.

When the signature information of the application is present in the whitelist 310, the control unit 170 executes the application (917).

When the signature information of the application is not present in the whitelist 310, the control unit 170 requests the user to confirm execution of the application (913), and checks whether the user has confirmed execution of the application (915). For example, the control unit 170 can output a notification indicating unidentified signature information and request the user to decide whether to continue application execution.

When the user has confirmed execution of the application (i.e. upon reception of user consent to application execution), the control unit 170 executes the application (917). In addition, the control unit 170 can request the user to decide whether to add the signature information of the application to the whitelist 310. For example, upon reception of user input for consenting to application execution, the control unit 170 can output a popup requesting the user to decide whether to add the signature information of the application to the whitelist 310 in the signature information storage 300. Here, checking user intention to add the signature information to the whitelist 310 can be skipped according to user settings.

When the user has not confirmed execution of the application (i.e. upon reception of user refusal for application execution), the control unit 170 requests the user to decide whether to uninstall the application (919). For example, upon reception of user input for cancelling application execution, the control unit 170 can output a popup requesting the user to decide whether to uninstall the application from the user device. Here, checking user intention for application uninstallation can be skipped according to user settings. Hence, the control unit 170 can automatically uninstall the application when the user cancels application execution.

When the user has decided not to uninstall the application (upon reception of user refusal for application uninstallation), the control unit 170 ends the execution procedure.

When the user has decided to uninstall the application (upon reception of user consent to application uninstallation), the control unit 170 uninstalls the application from the user device (921). After uninstallation, the control unit 170 ends the execution procedure.

Additionally, when the application is uninstalled, when user input for cancelling application execution is received, or when user input for refusing application uninstallation is received, the control unit 170 can request the user to decide whether to add signature information of the application to the blacklist 330. For example, the control unit 170 can output a popup requesting the user to decide whether to add the signature information of the application to the blacklist 330 in the signature information storage 300. Here, checking user intention to add the signature information to the blacklist 330 can be performed or skipped according to user settings.

The above control operation of the control unit 170 can be supported by the application manager 200 (the application execution controller 220 in particular). That is, the application execution controller 220 can compare signature information of a requested application with the blacklist 330 (the vendor-provided blacklist 331 in particular) and the whitelist 310 (the vendor-provided whitelist 311 in particular) stored in the signature information storage 300. When the signature information of the application is registered in the blacklist 330, the application execution controller 220 can prevent execution of the application. When the signature information of the application is registered in the whitelist 310, the application execution controller 220 can start to execute the application. For the application whose signature information is not registered either in the blacklist 330 or in the whitelist 310, the application execution controller 220 can initiate or prevent execution of the application according to user consent. Additionally, the application execution controller 220 can add the signature information of the application to the user-specified blacklist 333 or to the user-specified whitelist 313 in accordance with user consent.

As described above, in a disclosed embodiment, for an application that has been installed owing to erroneous user consent or an application that has been successfully installed but was not created by a trusted developer, the user is given an opportunity to disallow execution of such application. Hence, the possibility of executing a malignant application can be lowered.

In another embodiment, when an application is installed, signature information thereof can be stored together with the application. When an installed application is executed for the first time, an execution history for the application can be written. In particular, when an application whose signature information is registered in the whitelist 310 is successfully executed for the first time, an execution history indicating successful execution can be written for the application. When such an application having a successful execution history is executed later, authentication of the application can be skipped. The execution history of an application can be changed when signature information of the application is changed in the authentication list (for example, transfer of the signature information from the whitelist to the blacklist or from the blacklist to the whitelist). That is, the execution history of an application can be automatically updated according to the list in which signature information thereof is registered. For example, when signature information of an application is moved from the whitelist to the blacklist, the execution history of the application can be changed to indicate prohibition of normal execution. In reverse, when signature information of an application is moved from the blacklist to the whitelist, the execution history of the application can be changed to indicate permission of normal execution.

Figure 10:
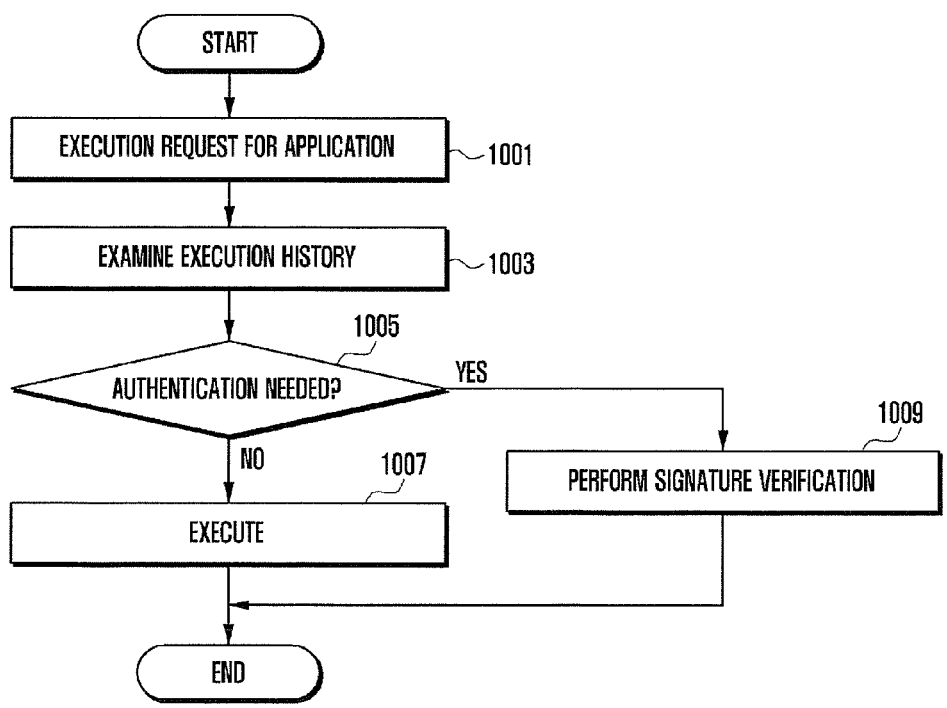
FIG. 10 illustrates a process for application execution in the user device according to a disclosed embodiment of the present disclosure.

FIG. 10 illustrates a process for application execution in the user device according to a disclosed embodiment of the present disclosure.

Referring to FIG. 10, the control unit 170 of the user device receives an execution request for an application (901). For example, the user can locate an application to be executed on a home screen or menu screen and issue an execution request by selecting or touching the located application.

Upon reception of user input requesting execution of an application, the control unit 170 examines the execution history of the requested application (1003) and determines whether authentication of the application is needed (1005). For example, the control unit 170 can examine the execution history of the application to determine whether the application is an application to be executed for the first time or is an application that has signature information registered in the whitelist 310 and has been successfully executed before. That is, the control unit 170 can determine that an application to be executed for the first time needs authentication and can determine that an application having been successfully executed before does not need authentication.

When authentication of the application is needed (i.e. the application is to be executed for the first time), the control unit 170 performs signature verification (1009). For example, the control unit 170 can check signature information of the application as described in relation with FIG. 9 to determine whether to execute the application.

When authentication of the application is not needed (i.e. the application has signature information registered in the whitelist 310 and has been successfully executed before), the control unit 170 executes the application as requested (1007).

In a feature of the disclosed embodiments, the method and apparatus for application management in a user device support signature-based application management, and check credibility of an application to be installed and control installation and execution thereof accordingly. That is, the method and apparatus support signature-based application management to ascertain whether an application to be installed is distributed by a trusted developer. The user can prevent installation and execution of a malignant application having originated from a suspicious source, enhancing security and safety of the user device.

In a related art technique, installation of an application can be allowed only when the application has a signature. In addition, once an application is installed in a user device, execution thereof is not examined. Hence, a malignant application can be installed and executed without user awareness, weakening security of the user device. In the disclosed embodiments, a signature-based application manager is used to enforce signature-based application installation to thereby prevent installation of a suspicious application. When installation of an application is inadvertently permitted by the user, for an execution request, the signature-based application manager requests the user to confirm execution of the application when the application is not created by a trusted developer. Hence, the disclosed embodiments can minimize possibility of execution of a malignant application, enhancing security of the user device.

The method and apparatus of the disclosed embodiments enable a user device to implement an optimal environment for facilitating a high level of security in application installation and execution, thereby enhancing user convenience and increasing device usability and competitiveness. The disclosed embodiments can be readily applied to a variety of user devices employing an operating system.

Embodiments of the disclosure can be implemented as computer programs and can be stored in various computer readable storage media. The computer readable storage media can store program instructions, data files, data structures and combinations thereof. The program instructions can include instructions developed specifically for the disclosed embodiments and existing general-purpose instructions.

The computer readable storage media can include magnetic media such as a hard disk and floppy disk, optical media such as a CD-ROM and DVD, magneto-optical media such as a floptical disk, and memory devices such as a ROM, RAM and flash memory. The program instructions can include machine codes produced by compilers and high-level language codes executable through interpreters. Each hardware device can be replaced with one or more software modules to perform operations according to the disclosed embodiments, and vice versa.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to manage an application in an electronic device, the method comprising:

receiving, by a touch display screen of the electronic device, a user input to install an application;

comparing, by a control unit of the electronic device, signature information of the application with signature information in an authentication list pre-stored in a storage unit of the electronic device;

preventing, by the control unit, if the signature information of the application is present in a blacklist of the authentication list, installation of the application;

initiating, by the control unit, if the signature information of the application is present in a whitelist of the authentication list, installation of the application; and selectively performing, by the control unit, if the signature information is not present in either the blacklist or the whitelist, installation of the application according to user consent, wherein signature information supplied by an application provider and signature information updated by use of the electronic device are separately stored in the storage unit, and wherein an execution history of the application is updated according to a list in which signature information of the application is registered.

2. The method of claim 1, wherein selectively performing installation of the application comprises:

receiving user input to consent to installation of the application;

adding the signature information of the application to the whitelist; and installing the application, wherein the signature information of the application is added to a user-specified whitelist of the whitelist.

3. The method of claim 1, wherein selectively performing installation of the application comprises:

receiving user input to cancel the installation of the application;

adding the signature information of the application to the blacklist; and preventing the installation of the application, wherein the signature information of the application is added to a user-specified blacklist of the blacklist.

4. The method of claim 1, wherein comparing the signature information of the application comprises determining whether the signature information of the application is present in one of the application provider-provided whitelist and the application provider-provided blacklist of the authentication list.

5. The method of claim 1, further comprising storing the signature information of the application in a form matching the application when the application is installed.

6. The method of claim 1, further comprising:

receiving user input to execute a selected application;

comparing signature information of the application to the authentication list stored in the signature information storage;

preventing, if the signature information of the application is present in the blacklist of the authentication list, an execution of the application;

initiating, if the signature information of the application is present in the whitelist of the authentication list, the execution of the application; and selectively performing, if the signature information of the application is not present in either the blacklist or the whitelist, an execution of the application according to user consent.

7. The method of claim 6, wherein preventing the execution of the application further comprises uninstalling the application from the electronic device.

8. The method of claim 6, wherein selectively performing the execution comprises:
receiving user input to consent to the execution of the application;
adding the signature information of the application to the whitelist; and
executing the application, wherein the signature information of the application is added to a user-specified whitelist of the whitelist.

9. The method of claim 6, wherein selectively performing the execution comprises:
receiving user input to cancel the execution of the application;
adding signature information of the application to the blacklist; and
preventing execution of the application, wherein the signature information of the application is added to a user-specified blacklist of the blacklist.

10. The method of claim 6, wherein comparing the signature information of the application comprises determining whether the signature information of the application is present in one of an application provider-provided whitelist and an application provider-provided blacklist of the authentication list.

11. The method of claim 6, wherein, if an application whose signature information of the application is present in the whitelist is executed, an execution history for the application is recorded.

12. The method of claim 11, wherein, if user input to execute an application is received, an execution history of the application is examined to determine whether the application needs authentication.

13. The method of claim 12, further comprising:
verifying, if authentication of the application is needed, signature information of the application; and
initiating, if authentication of the application is not needed, an execution of the application.

14. The method of claim 13, wherein applications needing authentication include an application to be executed for the first time and an application bearing an unidentified signature, and wherein applications not needing authentication include an application that has signature information of the application registered in the whitelist and has been successfully executed before.

15. An electronic device comprising:
a touch screen configured to receive user input to install an application;
a display unit configured to display a screen for an authentication list of applications, a screen to determine installation or execution of an application bearing an unidentified signature, and a screen to confirm registration of an application bearing an unidentified signature in the authentication list;
a storage unit configured to store applications, signature information, and the authentication list; and
a control unit configured to control a process of comparing, in response to an installation or execution request for an application, signature information of the application with signature information in the authentication list pre-stored in the storage unit, preventing, if the signature information of the application is present in a blacklist, installation or execution of the application, initiating, if the signature information of the application is present in a whitelist, installation or execution of the application, and selectively performing, if the signature information of the application is not present in either the blacklist or the whitelist, installation or execution of the application according to user consent, wherein signature information supplied by an application provider and a signature information updated by user of the electronic device are separately stored in the storage unit, and wherein an execution history of the application is updated according to a list in which signature information of the application is registered.

16. The electronic device of claim 15, wherein the storage unit includes a signature information storage storing a whitelist and a blacklist for signature information of application provider-provided applications, and wherein, in the signature information storage, the whitelist is separated into an application provider-provided whitelist and a user-specified whitelist and the blacklist is separated into an application provider-provided blacklist and a user-specified blacklist.

17. The electronic device of claim 16, wherein the application provider-provided whitelist and the application provider-provided blacklist are updated by vendors and the user-specified whitelist and the user-specified blacklist are updated by a user.

18. The electronic device of claim 15, wherein the control unit includes an application manager configured to control an installation and execution of an application on the basis of a signature of the application.

19. The electronic device of claim 15, wherein the control unit comprises:
an application installation controller configured to control, in response to an installation request for an application, one of a process of immediately installing the application, installing the application after obtaining user consent, and preventing installation of the application according to a signature of the application;
an application execution controller configured to control, in response to an execution request for an application, a process of immediately executing the application, executing the application after obtaining user consent, or preventing execution of the application according to a signature of the application; and
a signature information storage manager configured to manage application provider-provided signature information as a whitelist and blacklist and managing user-specified signature information.

20. The electronic device of claim 15, wherein the control unit is configured to record, when an application whose signature information of the application is present in the whitelist is executed, an execution history for the application, examine, when user input to execute an application is received, an execution history of the application to determine whether the application needs authentication, and control application execution according to necessity of authentication.

21. The electronic device of claim 20, wherein the control unit is configured to verify signature information of the application when authentication of the application is needed, and initiate execution of the application when authentication of the application is not needed, and wherein applications needing authentication include an application to be executed for the first time and an application bearing an unidentified signature, and applications not needing authentication include an application that has signature information of the application registered in the whitelist and has been successfully executed before.

22. A non-transitory, computer-readable storage medium for application management in an electronic device, the non-transitory, computer-readable medium storing a program that, when executed by a processor, causes the processor to:

receive user input to install an application, compare the signature information of the application with signature information in an authentication list pre-stored in a storage unit of the electronic device, prevent installation of the application if the signature information of the application is present in a blacklist of the authentication list, initiate installation of the application if the signature information of the application is present in a whitelist of the authentication list, and selectively perform installation of the application according to user consent if the signature information of the application is not present in either the blacklist or the whitelist, and wherein a signature information supplied by an application provider and a signature information updated by use of the electronic device are separately stored in the storage unit, and wherein an execution history of the application is updated according to a list in which signature information of the application is registered.

* * * * *